United States Patent
Lee et al.

(10) Patent No.: US 9,426,723 B2
(45) Date of Patent: Aug. 23, 2016

(54) INTEGRATED BASE STATION AND TERMINAL

(71) Applicant: ELECTRONICS AND TELECOMMUNICATIONS RESEARCH INSTITUTE, Daejeon (KR)

(72) Inventors: Seung-Que Lee, Daejeon (KR); Byung-Han Ryu, Daejeon (KR); Young Jick Bahg, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 63 days.

(21) Appl. No.: 14/626,322

(22) Filed: Feb. 19, 2015

(65) Prior Publication Data
US 2015/0289177 A1   Oct. 8, 2015

(30) Foreign Application Priority Data

Apr. 7, 2014   (KR) ......................... 10-2014-0041481

(51) Int. Cl.
*H04W 4/00*    (2009.01)
*H04W 48/12*   (2009.01)
*H04W 84/12*   (2009.01)
*H04W 88/10*   (2009.01)

(52) U.S. Cl.
CPC .............. *H04W 48/12* (2013.01); *H04W 84/12* (2013.01); *H04W 88/10* (2013.01)

(58) Field of Classification Search
CPC ...... H04W 48/12; H04W 84/12; H04W 88/10
See application file for complete search history.

(56) References Cited

U.S. PATENT DOCUMENTS

| | | | |
|---|---|---|---|
| 2011/0044240 A1* | 2/2011 | Jang ..................... | H04L 12/4633 370/328 |
| 2011/0182239 A1 | 7/2011 | Aoyagi | |
| 2013/0007728 A1 | 1/2013 | Oh et al. | |
| 2013/0077482 A1* | 3/2013 | Krishna ................ | H04W 36/22 370/230 |
| 2014/0213219 A1* | 7/2014 | Mohebbi ............... | H04W 92/02 455/411 |
| 2015/0133184 A1* | 5/2015 | Sadek .................... | H04W 16/14 455/552.1 |
| 2015/0373672 A1* | 12/2015 | Forssell ................. | H04L 47/76 370/329 |
| 2016/0113015 A1* | 4/2016 | Wu ........................ | H04W 36/06 370/329 |

FOREIGN PATENT DOCUMENTS

| | | |
|---|---|---|
| KR | 10-2009-0037227 A | 4/2009 |
| KR | 10-2011-0094843 A | 8/2011 |
| KR | 10-2012-0124111 A | 11/2012 |
| KR | 10-2013-0008157 A | 1/2013 |

* cited by examiner

*Primary Examiner* — Clemence Han
(74) *Attorney, Agent, or Firm* — NSIP Law

(57) ABSTRACT

An integrated base station which is a combination of a small cell base station and a wireless LAN access point is provided. The integrated base station includes: a small cell antenna that transmits and receives a small cell broadcast signal; a wireless LAN antenna that transmits and receives a wireless LAN signal; a small cell communication unit that broadcasts small cell broadcast information including wireless LAN access point information via the small cell antenna; and a wireless LAN communication unit that receives a wireless LAN report including a small cell camp-on report from a terminal that has received the small cell broadcast information, and passes the small cell camp-on report to the small cell communication unit.

8 Claims, 4 Drawing Sheets

INTEGRATED BASE STATION AND TERMINAL

CROSS-REFERENCE TO RELATED APPLICATION

This application claims priority to and the benefit of Korean Patent Application No. 1 0-201 4-0041 481 filed in the Korean Intellectual Property Office on Apr. 7, 2014, the entire contents of which are incorporated herein by reference.

BACKGROUND OF THE INVENTION (a) Field of the Invention

The present invention relates to an integrated base station and a terminal.

(b) Description of the Related Art

WiFi is a system that provides a wireless connection to a wired LAN environment. WiFi allows a user terminal to use the internet via a wireless access point (AP) installed on an internet connection line. WiFi has grown as an effective way to deal with the increase in mobile traffic, fuelled by the growth of smartphones, due to its simple structure and low communication costs.

Small cells are cells that are run by a base station in a mobile communication system that have a range of 10 to 20 meters, which are installed and operate in homes or buildings. In the analysis of an example of mobile communication users, small cell environments can be regarded as one of the next-generation mobile communication infrastructures capable of minimizing the decline in radio resource spectrum efficiency, caused by wall loss, in view of the fact that 70% of users tend to communicate indoors.

Typical examples of small cells include femtocells and picocells. Small cells are mobile communication systems which are small and low-powered mobile communication base stations that are run in homes. Fixed femtocell backhaul is typically a broadband internet network or a dedicated line, which connects small cells to a core network for mobile communication systems.

WiFi offers advantages like simplicity and low communication costs. However, it does not allow for charging, QoS (Quality-Of-Service) control, and handover because of the lack of per-user session management. On the other hand, small cells allow for per-user session management, handover, etc., but have the drawbacks of complex network structure and high communication costs compared with WiFi.

These two technologies have one major thing in common: support for wireless network offloading to overcome mobile traffic big bang. Therefore, though formerly considered competitors, the two technologies are now viewed as working collaboratively in unison to make best use of their own features and complement each other.

Small cells are usually personal cells because they are "small" compared to a macrocell. That is, unlike a macrocell on which many unspecified users in public areas can camp, a cell owner and people who have a connection with the cell owner, e.g., the cell owner's family, enterprise employees, or in-store customers can camp on a small cell. Accordingly, if the user camps on the small cell, this can be applied as very meaningful information and used for small-cell based services.

Examples of such small cell-based services can encompass a Virtual Memo service. With the Virtual Memo service, the user can write a message to a family member, and the family member can receive the message on his or her mobile phone as his or her presence is detected when he or she returns to a house. Since a message is delivered when the recipient enters the house, rather than when the user leaves the message, Virtual Memo makes messaging realistic, as if writing a message and leaving it on the fridge with a magnet. To provide such a small cell-based service, it is necessary for a base station to detect the user's camping on a small cell.

In the conventional standard technology, only the user terminal detects a camp-on event in the process of the terminal making a cell selection or reselection based on broadcast information. Afterwards, though the base station can be aware of a camp-on event in the process of the terminal's session configuration, not every terminal camping on a cell will detect its camp-on event, in view of the fact that only a terminal that requires session configuration can detect a camp-on event. Particularly, if the terminal switches to another cell after session configuration while being in the idle state since no data is used, the base station cannot detect the terminal's camp-on event without explicit session re-configuration.

A typical way of notifying a base station of a terminal's camp-on event is to send a message about cell selection or reselection wirelessly to the base station. This involves making many modifications to the existing standards, which will take considerable effort and time.

Moreover, a random access procedure is needed to report a message wirelessly to the base station. Thus, the radio resource costs required for random access are expected to rise. Accordingly, there arises a demand for a technique to detect a mobile terminal's camping on a cell that does not involve making many modifications to the existing standards and does not cause a rise in the cost of random access.

The conventional methods for a base station to detect a terminal's camping on a cell in a small-cell environment have the drawbacks of having to make many modifications to the standards and causing a rise in the cost of random access, because they are realized by means of small-cell technology and its related infrastructure.

SUMMARY OF THE INVENTION

The present invention has been made in an effort to provide an integrated base station and a terminal which detect a terminal's camping on a small cell under a communication environment where WiFi and the small cell operate in an integrated way.

An exemplary embodiment of the present invention provides an integrated base station which is a combination of a small cell base station and a wireless LAN access point, the integrated base station including: a small cell antenna that transmits and receives a small cell broadcast signal; a wireless LAN antenna that transmits and receives a wireless LAN signal; a small cell communication unit that broadcasts small cell broadcast information including wireless LAN access point information via the small cell antenna; and a wireless LAN communication unit that receives a wireless LAN report including a small cell camp-on report from a terminal that has received the small cell broadcast information, and passes the small cell camp-on report to the small cell communication unit.

The small cell communication unit may add wireless LAN access point identifier information and wireless LAN access point address information to the small cell broadcast information including cell selection parameters, a cell identifier, and a base station identifier.

The small cell communication unit and the wireless LAN communication may form a signaling link, and the wireless LAN communication unit may pass the small cell camp-on report to the small cell communication unit over the signaling link.

The wireless LAN communication unit may pass terminal or user information collected through the small cell camp-on report over the signaling link.

Another exemplary embodiment of the present invention provides a terminal including: a small cell antenna that transmits and receives a small cell broadcast signal; a wireless LAN antenna that transmits and receives a wireless LAN signal; a small cell communication unit that receives small cell broadcast information including wireless LAN access point information via the small cell antenna and performs a small cell selection procedure; and a wireless LAN communication unit that creates a wireless LAN report including a small cell camp-on report to notify of the terminal's camping on a small cell selected by the small cell communication unit and sends the wireless LAN report to a base station, identified based on the wireless LAN access point information, via the wireless LAN antenna.

The small cell communication unit and the wireless LAN communication unit may form a signaling link, and the small cell communication unit may pass cell selection information and the wireless LAN access point information to the wireless LAN communication unit over the signaling link.

The small cell communication unit may pass cell selection information, a wireless LAN access point identifier, and a wireless LAN access point address to the wireless LAN communication unit over the signaling link.

The wireless LAN communication unit may include a small cell camp-on report containing terminal information or user information in the wireless LAN report.

According to an embodiment of the present invention, a terminal's camping on a small cell base station is reported in a WiFi signal, through cooperation between WiFi and the small cell in an integrated environment where WiFi and the small cell operate together in a signal base station. Accordingly, interference control can be done easily at a low cost through cooperation between different wireless technologies. A terminal's camping on a mobile station can be detected easily, without the need for a random access procedure and without making many modifications to the standards.

DETAILED DESCRIPTION OF THE EMBODIMENTS

Figure 1:
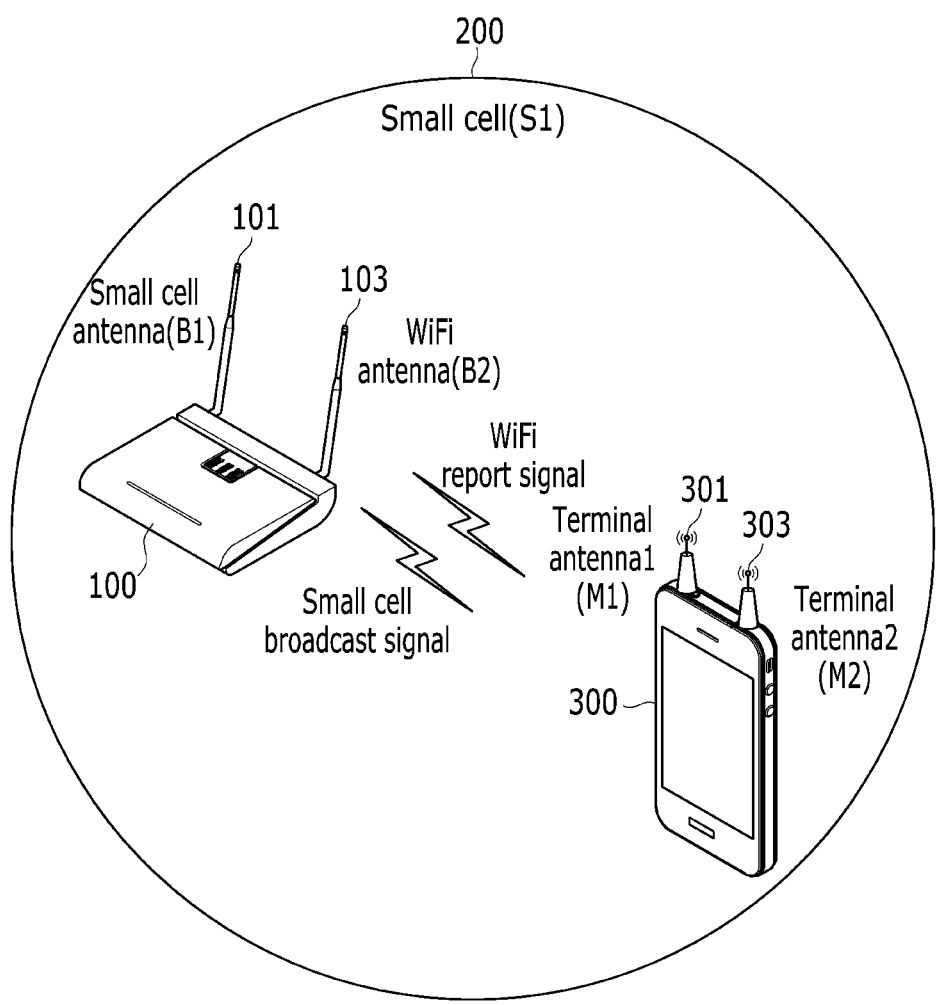
FIG. 1 is a view showing a communication environment where WiFi and a small cell operate in an integrated way to allow for detection of a terminal's camping on a small cell, and the operating principle of this communication environment.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a terminal may indicate user equipment UE, a mobile terminal (MT), a mobile station (MS), an advanced mobile station (AMS), a high reliability mobile station (HR-MS), a subscriber station (SS), a portable subscriber station (PSS), and an access terminal (AT), and it may include entire or partial functions of the UE, MT, MS, AMS, HR-MS, SS, PSS, and AT.

In the specification, a base station (BS) may indicate a node B (NodeB), an evolved node B (eNodeB), an advanced base station (ABS), a high reliability base station (HR-BS), an access point (AP), a radio access station (RAS), and a base transceiver station (BTS), and it may include entire or partial functions of the NodeB, eNodeB, BS, ABS, HR-BS AP, RAS, and BTS.

Now, an integrated base station and a terminal according to an exemplary embodiment of the present invention will be described in detail with reference to the drawings.

FIG. 1 is a view showing a communication environment where WiFi and a small cell operate in an integrated way to allow for detection of a terminal's camping on a small cell and the operating principle of this communication environment.

Referring to FIG. 1, an integrated base station 100 is a small-cell base station that supports both small cell service and WiFi service, and is integrated with WiFi.

The integrated base station 100 includes a small cell antenna (ANT B1) 101 for transmitting and receiving a small cell signal, and a WiFi antenna (ANT B2) 103 for transmitting and receiving a WiFi signal. A cell formed by the integrated base station 100 is a small cell (S1) 200.

A terminal 300 is a WiFi-integrated terminal that supports both small cell service and WiFi service. Like the integrated base station 100, the terminal 300 includes a small cell antenna (ANT M1) 301 for transmitting and receiving a small cell signal, and a WiFi antenna (ANT M2) 303 for transmitting and receiving a WiFi signal.

A broadcast signal for small cell service is transmitted and received as a small cell broadcast signal via the small cell antenna (ANT B1) 101 and the small cell antenna (ANT M1) 301.

A broadcast signal the integrated base station 100 transmits and receives via the small cell antenna (ANT B1) 101 contains a variety of cell selection parameters defined in the standards, a cell identifier, a base station identifier, and WiFi wireless access point (AP)-related information. The WiFi wireless AP-related information may include an AP identifier and an AP address.

The terminal 300 receives the broadcast signal from the integrated base station 100 to refer to the reception strength and the cell selection parameters, and selects or reselects the best cell by taking into account internal policy. Such a cell selection or reselection event is reported to the integrated base station 100 by a WiFi report signal. The WiFi report signal is transmitted and received via the WiFi antenna (ANT B2) 103 and the WiFi antenna (ANT M2) 303.

The WiFi report signal contains information about the terminal or the user. Based on this information, the integrated base station 100 can detect the terminal 300 camping on a small cell (S1) 200.

As such, the terminal 300's camping on the small cell (S1) 200 can be easily reported via WiFi without creating a message involving random access.

Figure 2:
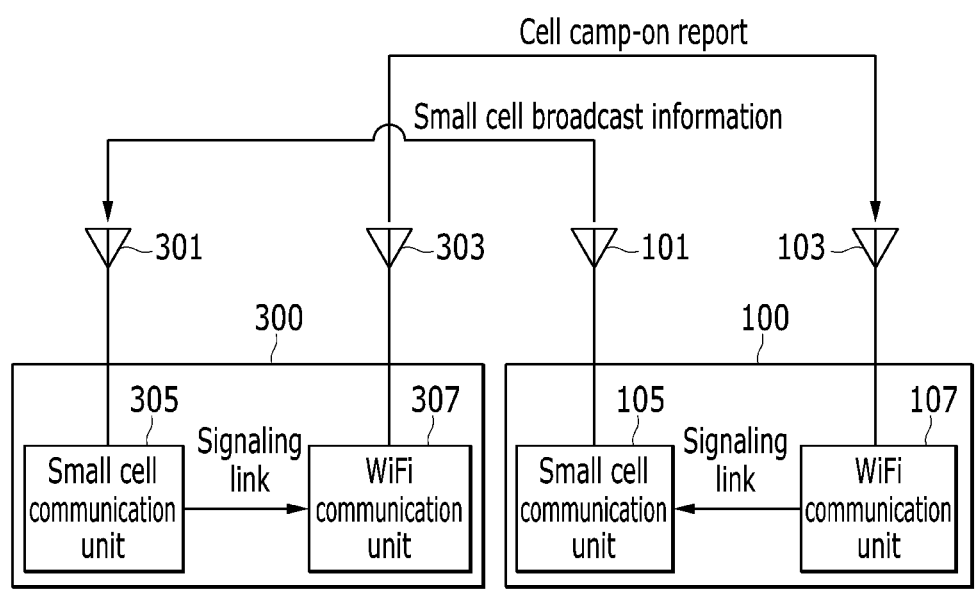
FIG. 2 is a block diagram showing an integrated base station and a terminal according to an exemplary embodiment of the present invention.

FIG. 2 is a block diagram showing an integrated base station and a terminal according to an exemplary embodiment of the present invention.

Referring to FIG. 2, the integrated base station 100 includes a small cell antenna 101, a WiFi antenna 103, a small cell communication unit 105, and a WiFi communication unit 107. The terminal 300 includes a small cell antenna 301, a WiFi antenna 303, a small cell communication unit 305, and a WiFi communication unit 307.

Normally, a small cell signal is transmitted and received by the small cell antennas 101 and 301 and the small cell communication units 105 and 305. A WiFi signal is transmitted and received by the WiFi antennas 103 and 303 and the WiFi communication units 107 and 307.

Small cell broadcast information sent by the small cell communication unit 105 of the integrated base station 100 is received by the small cell communication unit 305 of the terminal 300. The broadcast information contains WiFi wireless AP-related information, in addition to broadcast information defined in the standards.

The terminal 300 makes a cell selection or reselection in accordance with an internal algorithm. The WiFi communication unit 307 of the terminal 300 is notified of this event over a signaling link. The notification contains WiFi wireless AP-related information that is acquired from the broadcast information.

The WiFi communication unit 307 of the terminal 300 sends a cell camp-on report to the WiFi communication unit 107 of the designated integrated base station 100 by referring to the WiFi wireless AP-related information. The cell camp-on report contains information about the terminal or the user.

Upon receiving the cell camp-on report, the integrated base station 100 notifies the small cell communication unit 105 of the reception over the signaling link. The notification contains information about the terminal or the user that is collected from the cell camp-on report.

In this way, an integrated terminal's cell camp-on event that occurs in the small cell-related functional units 101, 105, 301, and 305 can be reported over the signaling link for cooperation between the small cell and WiFi, with the aid of the WiFi-related functional units.

The signaling link is an internal interface for transmitting signals between WiFi components and small cell components within the integrated base station 100 or the terminal 300.

Figure 3:
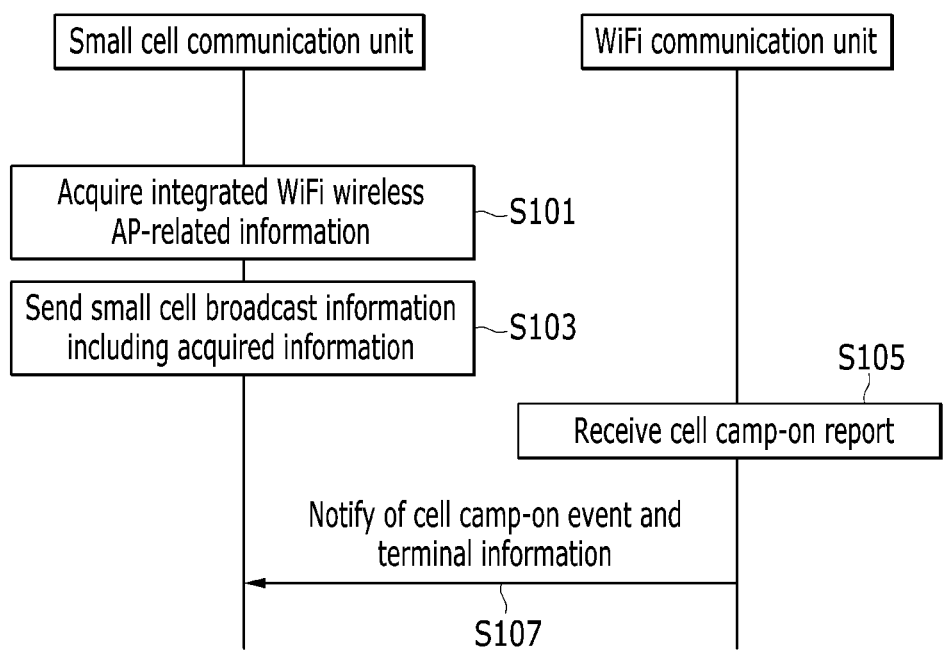
FIG. 3 is a flowchart showing the operation of an integrated base station according to an exemplary embodiment of the present invention.

FIG. 3 is a flowchart showing the operation of an integrated base station according to an exemplary embodiment of the present invention.

Referring to FIG. 3, the small cell communication unit 103 of the integrated base station 100 acquires integrated WiFi wireless AP-related information before sending broadcast information (S101). The WiFi wireless AP-related information may be various types of information including a WiFi identifier and a wireless AP address. The integrated base station 100 may acquire WiFi wireless AP-related information integrated via an internal interface.

The small cell communication unit 103 sends small cell broadcast information including information defined in the standards (S103). The small cell broadcast information may optionally include WiFi wireless AP-related information.

Afterwards, the WiFi communication unit 107 of the integrated base station 100 receives a cell camp-on report from the terminal 300 (S105). Then, the WiFi communication unit 107 notifies (S107) the small cell communication unit 105 of the cell camp-on event and information about the terminal or the user received through the cell camp-on report over a signaling link, and completes the operation.

By doing so, the integrated base station 100 can detect the terminal 300's camping on the small cell 200.

Figure 4:
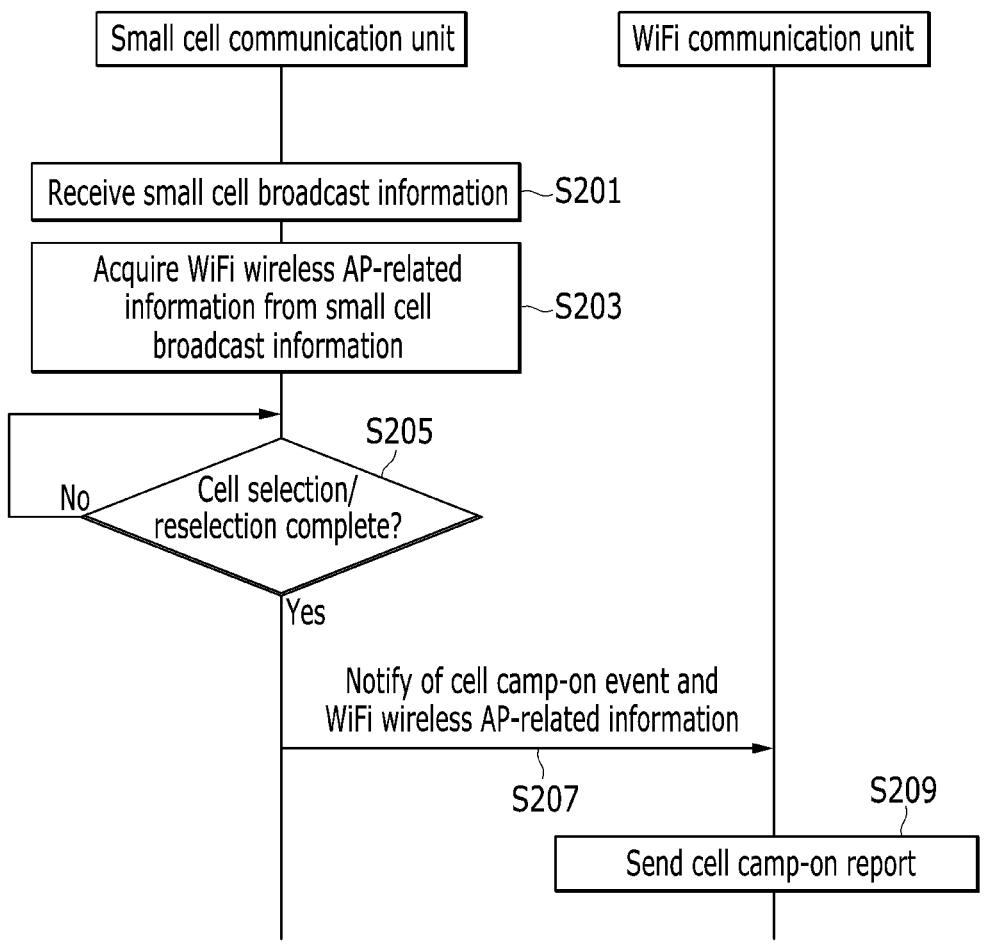
FIG. 4 is a flowchart showing the operation of a terminal according to an exemplary embodiment of the present invention.

FIG. 4 is a flowchart showing the operation of a terminal according to an exemplary embodiment of the present invention.

Referring to FIG. 4, the small cell communication unit 305 of the terminal 300 receives small cell broadcast information broadcast by the integrated base station 100 (S201). Then, the small cell communication unit 305 acquires WiFi wireless AP-related information (S203). The WiFi wireless AP-related information can be acquired from the small cell broadcast information, or in other ways.

When a cell selection or reselection procedure is completed in accordance with a cell selection or reselection algorithm within the terminal (S205), the small cell communication unit 305 notifies the WiFi communication unit 307 of the cell camp-on event and the WiFi wireless AP-related information over a signaling link (S207).

The WiFi communication unit 307 acquires information about the terminal or the user (S209). The information about the terminal or the user may be various types of information including the terminal identifier or the user identifier. The information about the terminal or the user is contained in a storage space within the terminal 300.

The WiFi communication unit 307 sends the integrated base station 100 a cell camp-on report including the terminal identifier or user identifier acquired in S209, and them completes the operation.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An integrated base station which is a combination of a small cell base station and a wireless LAN access point, the integrated base station comprising:
    a small cell antenna that transmits and receives a small cell broadcast signal;
    a wireless LAN antenna that transmits and receives a wireless LAN signal;
    a small cell communication unit that broadcasts small cell broadcast information including wireless LAN access point information via the small cell antenna; and
    a wireless LAN communication unit that receives a wireless LAN report including a small cell camp-on report from a terminal that has received the small cell broadcast information, and passes the small cell camp-on report to the small cell communication unit.

2. The integrated base station of claim 1, wherein the small cell communication unit adds wireless LAN access point identifier information and wireless LAN access point address information to the small cell broadcast information including cell selection parameters, a cell identifier, and a base station identifier.

3. The integrated base station of claim 1, wherein the small cell communication unit and the wireless LAN communication form a signaling link, and the wireless LAN communication unit passes the small cell camp-on report to the small cell communication unit over the signaling link.

4. The integrated base station of claim 3, wherein the wireless LAN communication unit passes terminal or user information collected through the small cell camp-on report over the signaling link.

5. A terminal comprising:
- a small cell antenna that transmits and receives a small cell broadcast signal;
- a wireless LAN antenna that transmits and receives a wireless LAN signal;
- a small cell communication unit that receives small cell broadcast information including wireless LAN access point information via the small cell antenna and performs a small cell selection procedure; and
- a wireless LAN communication unit that creates a wireless LAN report including a small cell camp-on report to notify of the terminal's camping on a small cell selected by the small cell communication unit and sends the wireless LAN report to a base station, identified based on the wireless LAN access point information, via the wireless LAN antenna.

6. The terminal of claim 5, wherein the small cell communication unit and the wireless LAN communication unit form a signaling link, and the small cell communication unit passes cell selection information and the wireless LAN access point information to the wireless LAN communication unit over the signaling link.

7. The terminal of claim 6, wherein the small cell communication unit passes cell selection information, a wireless LAN access point identifier, and a wireless LAN access point address to the wireless LAN communication unit over the signaling link.

8. The terminal of claim 7, wherein the wireless LAN communication unit includes a small cell camp-on report containing terminal information or user information in the wireless LAN report.

* * * * *